United States Patent [19]

Kato et al.

[11] Patent Number: 5,527,622
[45] Date of Patent: Jun. 18, 1996

[54] PACKAGING LAMINATE MATERIAL

[75] Inventors: Eiichi Kato; Eiji Takahashi; Hiroshi Kondo, all of Tokyo; Hiroji Niimi, Yamaguchi; Takashi Hiraoka, Yamaguchi; Masayuki Sakai, Yamaguchi; Masaki Kohsaka, Yamaguchi, all of Japan

[73] Assignees: Mitsui Petrochemical Industries, Ltd.; Nippon Paper Industries Co., Ltd., both of Tokyo, Japan

[21] Appl. No.: 296,167

[22] Filed: Aug. 29, 1994

Related U.S. Application Data

[63] Continuation of Ser. No. 924,031, filed as PCT/JP92/00417, Apr. 3, 1992 published as WO92/17334, Oct. 15, 1992.

[30] Foreign Application Priority Data

Apr. 4, 1991 [JP] Japan .................................... 3-071892

[51] Int. Cl.⁶ ..................... B32B 27/10; B32B 27/36; B32B 7/10; C08G 63/16
[52] U.S. Cl. ..................... 428/481; 428/34.2; 428/349; 528/308.6; 528/308.7; 528/296; 528/302; 528/307
[58] Field of Search .................................... 428/480, 481, 428/34.2, 35.7, 346, 347, 349, 355, 480, 481, 483; 528/302, 306, 307, 308, 308.1, 308.6, 308.7, 296

[56] References Cited

U.S. PATENT DOCUMENTS

| | | | |
|---|---|---|---|
| 3,182,041 | 5/1965 | Watkins et al. | 260/75 |
| 4,006,112 | 1/1977 | Bateman et al. | 260/9 |
| 4,122,073 | 10/1978 | Georgoudis | 260/873 |
| 4,140,729 | 2/1979 | Tobias | 260/850 |
| 4,481,352 | 11/1984 | McConnell et al. | 528/302 |
| 5,059,470 | 10/1991 | Fukuda et al. | 428/142 |
| 5,116,670 | 5/1992 | Suzuki et al. | 428/285 |

FOREIGN PATENT DOCUMENTS

| | | |
|---|---|---|
| 0204528 | 12/1986 | European Pat. Off. . |
| 1119804 | 7/1968 | United Kingdom . |

*Primary Examiner*—Paul J. Thibodeau
*Assistant Examiner*—Vivian Chen
*Attorney, Agent, or Firm*—Sherman and Shalloway

[57] ABSTRACT

A packaging laminate material comprises a paper substrate and a polyester resin layer provided on at least the innermost surface side of the substrate, wherein the polyester resin comprises dicarboxylic acid units comprising terephthalic acid and adipic acid and dihydroxy compound units comprising ethylene glycol and a second different dihydroxy compound. The polyester may also contain polyfunctional units derived from a polycarboxylic acid having a valence of 3 or more and/or derived from a polyglycol having a valence of 3 or more. The packaging laminate has a high heat-sealing strength, a small decrease in the heat-sealing strength even after the laminate is subjected to a hot water treatment or a hot hydrogen peroxide treatment, and is excellent in scent (odor) retention properties.

5 Claims, 6 Drawing Sheets

Example 11  △:Untreated material  ○:Treated material

Comparative
Example 14  ▲:Untreated material  ●:Treated material

Fig. 4

○: Example 13
△: Comparative Example 17
●: Comparative Example 18

PACKAGING LAMINATE MATERIAL

This application is a continuation, of application Ser. No. 07/924,031, which is a 371 of PCT/JP92/00417, filed on Apr. 3, 1992, published as WO92/17334, Oct. 15, 1992.

TECHNICAL FIELD

The present invention relates to packaging laminate materials. More particularly, the invention relates to packaging laminate materials which can prevent deteriorations of taste and scent of the content for a long period of time and are hardly reduced in the heat-sealing strength even after the laminate materials are subjected to a sterilization treatment with hot hydrogen peroxide for sterile filling of the content.

BACKGROUND ART

Containers for liquids comprising a paper substrate coated with a resin have such characteristics that the containers can keep the qualities of the content for a long period of time in the case of charging liquids in the sterilized containers at a low temperature, and therefore a demand for such containers has been rapidly extended in recent years. Objects of long-term storage include milk, juices, coffee drinks, soups, etc, and they are charged in the containers after subjected to a high-temperature instantaneous sterilization.

The containers for liquids are manufactured by coating both surface sides of a paper substrate with a polyolefin resin and heat-sealing the polyolefin resin laminated on the paper substrate. In the case where liquids having delicate taste such as juice, liquor, etc. are filled into the containers having a polyolefin resin layer as the inmost layer, scent of the content is reduced or taste of the content is deteriorated in many cases. The deterioration of taste of the content in the containers is caused, for example, by that a low-molecular compound contained in the inmost layer of polyolefin resin or a decomposition product or volatile component produced during the lamination of the resin is transferred to the content in accordance with a rise of the liquid temperature, or the taste or scent of the content is reduced owing to the adsorptivity of the resin itself. Further, the polyolefin resin has a permeability, so that external odor transfers into the content to produce foreign taste or foreign odor, or the scent of the content escapes outside.

Various containers improved in the above-mentioned defects of the polyolefin resins have been now developed. For example, a container having a low-crystalline or non-crystalline polyester resin layer as the inmost layer (Japanese Patent Laid-open Publications No. 55(1980)-166247, No. 56(1981)-24165, No. 62(1987)-290534, etc.) or a container having a terpolymer polyester resin layer as the inmost layer (Japanese Patent Laid-open Publication No. 59(1984)-59435) are proposed as a container improved in the scent adsorption.

Paper containers for liquids now employed are roughly classified into two types, that is, so-called brick type containers and gable type containers. Processes for hydrogen peroxide sterilization treatments of those containers are different from each other. In the case of the brick type containers, a process of continuously immersing the laminate material in a hot hydrogen peroxide liquid and then drying it is mainly carried out.

In the case of gable type containers, on the other hand, there is carried out a process of cutting the laminate material into a carton-extended shape, heat-sealing the transverse cross section to prepare a semi-finished carton, further heat-sealing its bottom portion and then spraying it with hydrogen peroxide, or a process of placing a carton in vapored hydrogen peroxide to produce dropwise condensation of the hydrogen peroxide (Japanese Patent Laid-open Publication No. 63(1988)-11163) and then drying the carton.

However, the present inventors have found that containers having an inside layer made of a polyester resin well known in the art as a non-crystalline polyester resin having high scent retention properties (trade name: PETG6763, available from Eastman Kodak) are markedly reduced in the heat-sealing properties when the containers are subjected to the above-mentioned hydrogen peroxide sterilization treatment.

As described above, the packaging laminate materials comprising a polyolefin resin are deteriorated in the scent retention properties, and the packaging laminate materials comprising a polyester resin are reduced in the heat-sealing properties by the hydrogen peroxide sterilization treatment, though they are good in the scent retention properties as compared with those laminated with a polyolefin resin.

The present invention intends to solve the above-mentioned problems in the prior art, and the object of the invention is to provide a packaging laminate material which is excellent in the heat-sealing properties and the scent retention properties and is hardly reduced in the heat-sealing properties even after subjected to a hot water treatment or a hot hydrogen peroxide treatment.

DISCLOSURE OF INVENTION

The packaging laminate material of the present invention is a packaging laminate material comprising a paper substrate and a polyester resin layer provided on at least the inmost surface side, wherein the polyester resin comprises:

[A] dicarboxylic acid units comprising constituent units derived from an aromatic dicarboxylic acid in an amount of 80 to 95 mole % and constituent units derived from an aliphatic dicarboxylic acid in an amount of 20 to 5 mole % based on 100 mole % of the dicarboxylic acid base units; and

[B] dihydroxy compound units comprising constituent units derived from ethylene glycol in an amount of 55 to 90 mole % and constituent units derived from at least one of compounds represented by the following formulas (1) to (3) in an amount of 45 to 10 mole % based on 100 mole % of the dihydroxy compound units:

(1)

(2)

(3)

wherein each of $R^1$ and $R^2$ is hydrogen or an alkyl group of 1–20 carbon atoms, n is an integer of 1 to 10, and m is an integer of 1 to 10.

The layer of the polyester resin mentioned as above has a heat-sealing strength of not less than 2.0 kgf/15 mm, preferably not less than 2.5 kgf/15 mm, more preferably not less than 3.0 kgf/15 mm, as measured in a condition of a heat-sealing temperature of 130° C. in accordance with JIS Z 1707, and has a heat-sealing strength of not less than 1.0 kgf/15 mm, preferably, not less than 1.5 kgf/15 mm, more preferably not less than 2.0 kgf/15 mm, as measured in a condition of a heat-sealing temperature of 130° C. wherein the tested polyester resin layer has been immersed in a 35% hydrogen peroxide aqueous solution of 80° C. for 30 seconds, wiped off the hydrogen peroxide aqueous solution and dried by air blow at 70° C. for 30 minutes before testing.

The heat-sealing strength measured in accordance with JIS Z 1707 in the invention is measured as described in the later-described Example 1.

The polyester resin may contain [C] constituent units derived from a polycarboxylic acid of 3 or more valences and/or constituent units derived from a polyhydroxy compound of 3 or more valences if necessary, in addition to the above-mentioned dicarboxylic acid units [A] and dihydroxy compound units [B].

1:substrate
2:scent retention sealing layer
3:gas barrier layer
11:paper layer
12:polyolefin layer
21:polyester resin layer
31:gas barrier film layer
41, 41, 42:adhesive layer
101:film specimen
102:Teflon film
103:upper sealing bar
104:lower sealing bar

BEST MODE FOR CARRYING OUT THE INVENTION

The packaging laminate material of the present invention is described hereinafter.

The packaging laminate material of the invention comprises a paper substrate and a polyester resin layer having a specific composition on the inmost surface side (on the side contacting the content of a container).

The polyester resin comprises:

[A] dicarboxylic acid units comprising constituent units derived from an aromatic dicarboxylic acid in an amount of 80 to 95 mole % and constituent units derived from an aliphatic dicarboxylic acid in an amount of 20 to 5 mole % based on 100 mole % of the dicarboxylic acid units; and

[B] dihydroxy compound units comprising constituent units derived from ethylene glycol in an amount of 55 to 90 mole % and constituent units derived from at least one of compounds represented by the above formulas (1) to (3) in an amount of 45 to 10 mole %, based on 100 mole % of the dihydroxy compound units.

Examples of the aromatic dicarboxylic acid constituent units constituting the polyester resin according to the invention include constituent units derived from terephthalic acid, phthalic acid, isophthalic acid, naphthalenedicarboxylic acid, diphenyldicarboxylic acid and diphenoxyethanedicarboxylic acid. Of these, constituent units derived from terephthalic acid are preferred.

Examples of the aliphatic dicarboxylic acid constituent units include constituent units derived from adipic acid, sebacic acid, azelaic acid and decanedicarboxylic acid. Of these, constituent units derived from adipic acid are preferred.

The dihydroxy unites comprise constituent units derived from ethylene glycol as essential constituents, and further comprise the following glycol constituents.

Examples of the compounds represented by the above formula (1) include trimethylene glycol, propylene glycol, tetramethylene glycol, neopentyl glycol, hexamethylene glycol, dodecamethylene glycol and bis(2-hydroxyethyl)dimethylmethane.

Examples of the compounds represented by the above formula (2) include cyclohexanedimethanol, cyclohexanediethanol, cyclohexanedipropanl and cyclohexanedibutanol Examples of the compounds represented by the above formula (3) include bis(2-hydroxyethoxyphenyl)dimethylmethane.

Of these compounds, preferred are neopentyl glycol, cyclohexanedimethanol and bis(2-hydroxyethoxyphenyl)dimethylmethane, and particularly preferred are cyclohexanedimethanol and neopentyl glycol.

Among the polyester resins, a polyester resin having the following composition is particularly preferably employed. That is, the polyester resin comprises:

[A"] dicarboxylic acid units comprising constituent units derived from a terephthalic acid in an amount of 80 to 95 mole % preferably 84 to 92 mole % and constituent units derived from an adipic acid in an amount of 20 to 5 mole %, preferably 16 to 8 mole %, each being based on 100 mole % of the dicarboxylic acid units; and

[B"] dihydroxy compound units comprising constituent units derived from ethylene glycol in an amount of 55 to 90 mole %, preferably 60 to 85 mole %, and constituent units derived from cyclohexanedimethanol in an amount of 45 to 10 mole %, preferably 40 to 15 mole %, each being based on 100 mole % of the dihydroxy compound units.

This polyester resin may be co-condensed with a polycarboxylic acid compound of 3 or more valences and/or a polyhydroxy compound of 3 or more valences in an amount of not more than 2 mole %.

Concrete examples of the polycarboxylic acid compounds of 3 or more valences include trimellitic acid and pyromellitic acid. Among the above compounds, trimellitic acid is preferred.

Concrete examples of the polyhydroxy compounds of 3 or more valences include trimethylolmethane, trimethylolethane, trimethylolpropane and pentaerythritol.

Among the above compounds, trimethylolpropane is preferred.

It is desired that the layer of the polyester resin mentioned as above has a heat-sealing strength of generally not less than 2.0 kgf/15 mm, preferably not less than 2.5 kgf/15 mm, more preferably not less than 3.0 kgf/15 mm, as measured at a heat-sealing temperature of 130° C. in accordance with JIS Z 1707. Further, it is also desired that the polyester resin layer has a heat-sealing strength of generally not less than 1.0 kgf/15 mm, preferably not less than 1.5 kgf/15 mm, more preferably not less than 2.0 kgf/15 mm, as measured at a heat-sealing temperature of 130° C. wherein the test sample has been immersed in a 35% hydrogen peroxide aqueous solution of 80° C. for 30 seconds, wiped off the hydrogen peroxide aqueous solution and dried by air blow at 70° C. for 30 minutes, before testing.

Further, it is desired that the polyester resin has an intrinsic viscosity [η] of generally 0.40 to 1.0 dl/g, preferably 0.50 to 0.90 dl/g, and a glass transition temperature (Tg) of generally 45° C. to 80° C., preferably 50° C. to 75° C.

The intrinsic viscosity [η] is measured in the following manner. That is, a polyester resin is dissolved in o-chlorophenol in a concentration of 1 g/100 ml to measure a solution viscosity at 25° C. using an Ubbelode type capillary viscometer, then o-chlorophenol is gradually added to the solution to measure a solution viscosity on the lower concentration side, and a viscosity in a concentration of 0% is extrapolated to determine the intrinsic viscosity ([η]).

In the invention, the above-mentioned polyester resin particularly preferably used may contain other dicarboxylic acid units than the dicarboxylic acid units derived from terephthalic acid and adipic acid and/or other dihydroxy compound units than the dihydroxy units derived from ethylene glycol, cyclohexanedimethanol and neopentyl glycol, in an appropriate amount.

Concrete examples of the dicarboxylic acid units include those derived from:

aromatic dicarboxylic acids such as phthalic acid, isophthalic acid, naphthalenedicarboxylic acid, diphenyldicarboxylic acid and diphenoxyethanedicarboxylic acid;

aliphatic dicarboxylic acids such as sebacic acid, azelaic acid and decanedicarboxylic acid; and alicyclic dicarboxylic acids such as cyclohexanedicarboxylic acid.

Concrete examples of the dihydroxy compound units include those derived from diethylene glycol, triethylene glycol, polyethylene glycol, cyclohexane diol, 1,3-bis(2-hydroxyethoxy)benzene, 1,4-bis(2-hydroxyethoxy)benzene and bis(4-β-hydroxyethoxyphenyl)sulfone.

The polyester resin according to the invention may further contain constituent units derived from monofunctional compounds such as benzoylbenzoic acid, diphenylsulfonemonocarboxylic acid, stearic acid, methoxypolyethylene glycol and phenoxypolyethylene glycol, in a small amount, for example, in an amount of not more than 2 mole %.

Further, to the polyester resin according to the invention may be appropriately added conventionally known various additives such as a nucleating agent, an inorganic filler, a lubricant, a slip agent, an anti-blocking agent, a stabilizer, an antistatic agent, an anti-fogging agent and a pigment, if necessary. Furthermore, conventionally known resins other than polyethylene terephthalate, such as a resin having gas barrier properties, may be also added to the polyester resin, if desired, and the amount thereof can be appropriately determined.

The polyester resin employable for the packaging laminate material of the invention can be prepared by a conventional process except for using the above-mentioned specific compounds as starting compounds in the specific amounts.

Preparation of the polyester resin may be carried out by a batch process, a continuous process, etc. For example, in the case of using a continuous process, the polyester resin can be prepared in the following manner.

First, a dicarboxylic acid comprising a terephthalic acid and an adipic acid or an ester-forming derivative thereof is mixed with a dihydroxy compound comprising ethylene glycol, cyclohexanedimethanol and neopentyl glycol or an ester-forming derivative thereof and if necessary a polycarboxylic acid compound of 3 or more valences and/or a polyhydroxy compound of 3 or more valences, to prepare a slurry. In the slurry, the dihydroxy compound component or the ester-forming derivative thereof is contained in an amount of 1.02 to 2.0 mole, preferably 1.03 to 1.5 mole, per 1 mole of the dicarboxylic acid component or the ester-forming derivative thereof. Further, the amount of the polycarboxylic acid compound of 3 or more valences and/or the polyhydroxy compound of 3 or more valences which is used in case of necessity is in the range of 0.01 to 2 mole %, preferably 0.05 to 1 mole %, based on 100 mole % of the total amounts of the dicarboxylic acid and the dihydroxy compound. This slurry is continuously supplied in the esterification reaction stages.

The esterification reaction is carried out using a device comprising at least two esterification reactors connected with each other in series under the condition that the dihydroxy compound is refluxed, while removing a water produced by the reaction from the system by the use of a rectifying column. The reaction conditions for the esterification reaction are as follows. That is, in the first esterification reaction stage, the temperature is generally in the range of 240° to 270° C., preferably 245° to 265° C. and the pressure is generally in the range of 0.2 to 3 kg/cm²-G, preferably 0.5 to 2 kg/cm²-G. In the last esterification reaction stage, the temperature is generally in the range of 250° to 280° C. preferably 255° to 275° C. and the pressure is generally in the range of 0 to 1.5 kg/cm²-G, preferably 0 to 1.3 kg/cm²-G.

Accordingly, in the case of carrying out the esterification reaction in two stages, the esterification reaction conditions in the first and the second stages are within the above-mentioned ranges, and in the case of carrying out the esterification reaction in three or more stages, the esterification reaction conditions in stages of the second to the last but one are conditions between the reaction conditions in the first stage and the reaction conditions in the last stage. For example, in the case of carrying out the esterification reaction in three stages, the reaction temperature in the second esterification reaction stage is generally in the range of 245° to 275° C., preferably 250° to 270° C., and the pressure in this stage is generally in the range of 0 to 2 kg/cm²-G, preferably 0.2 to 1.5 kg/cm²-G.

There is no specific limitation on a conversion of the esterification reaction in each stages, but it is preferred that a rise of the esterification reaction conversion in each stage is smoothly distributed and that the esterification reaction conversion reaches generally not less than 90%, preferably not less than 93% in the esterification reaction product of the last reaction stage.

Through the esterification, a lower condensate is obtained, and a number-average molecular weight of this lower condensate is generally in the range of 500 to 5,000.

The esterification reaction can be carried out in the presence of the later-described polycondensation catalyst. Further, it is preferred to use tertiary amines such as triethylamine, tri-n-butylamine and benzyldimethylamine, quaternary ammonium hydroxides such as tetraethylammonium hydroxide, tetra-n-butylammonium hydroxide and trimethylbenzylammonium hydroxide, and basic compounds such as lithium carbonate, sodium carbonate, potassium carbonate and sodium acetate, in a small amount in the esterification reaction, because a proportion of dioxyethylene terephthalate units in the main chain of the polyester resin can be kept at a relatively low level.

Subsequently, the obtained lower condensate is heated to a temperature of not lower than the melting point of the resulting polyester resin under a reduced pressure in the presence of a polycondensation catalyst to polycondensate the lower condensate, while removing glycol produced in this process out of the reaction system.

The polycondensation reaction in the liquid phase may be carried out either in one stage or in plural stages. In the case of carrying out the polycondensation reaction in plural stages, the reaction temperature in the first polycondensation reaction stage is generally in the range of 250° to 290° C., preferably 260° to 280° C., and the pressure in this stage is generally in the range of 500 to 20 Torr, preferably 200 to 30 Torr; and the temperature in the last polycondensation reaction stage is generally in the range of 265° to 300° C., preferably 270° to 295° C., and the pressure in this stage is generally in the range of 10 to 0.1 Torr, preferably 5 to 0.5 Torr.

In the case of carrying out the polycondensation reaction in two stages, the polycondensation reaction conditions in the first and the second stages are within the above-mentioned ranges, and in the case of carrying out the polycondensation reaction in three or more stages, the esterification reaction conditions in stages of the second to the last but one are conditions between the reaction conditions in the first stage and the reaction conditions in the last stage.

For example, in the case of carrying out the polycondensation reaction in three stages, the reaction temperature in the second polycondensation reaction stage is generally in the range of 260° to 295° C., preferably 270° to 285° C. and the pressure in this stage is generally in the range of 50 to 2 Torr, preferably 40 to 5 Torr. There in no specific limitation on the intrinsic viscosity [η] of the polyester resin obtained in each stage, but it is preferred that a rise of the intrinsic viscosity thereof in each stage is smoothly distributed and that the intrinsic viscosity [η] of the polyester resin obtained in the polycondensation reactor of the last stage is generally in the range of 0.40 to 1.0 dl/g, preferably 0.5 to 0.9 dl/g.

The polycondensation reaction can be preferably carried out in the presence of a catalyst and a stabilizer. Examples of the catalysts employable in the reaction include germanium compounds such as germanium dioxide, germanium tetraethoxide, germanium tetra-n-butoxide; antimony catalysts such as antimony trioxide; and titanium catalysts such as titanium tetrabutoxide. Of these catalysts, germanium dioxide compounds are preferably employed.

Examples of the stabilizers employable in the reaction include phosphates such as trimethyl phosphate, triethyl phosphate, tri-n-butyl phosphate, trioctyl phosphate and triphenyl phosphate; phosphites such as triphenyl phosphite, trisdodecyl phosphite and trisnonylphenyl phosphite; acid phosphates such as methyl acid phosphate, isopropyl acid phosphate, butyl acid phosphate, dibutyl phosphate, monobutyl phosphate and dioctyl phosphate; and phosphorus compounds such as phosphoric acid and polyphosphoric acid.

The amount of the catalyst or the stabilizer used in the reaction is as follows. In the case of using the catalyst, the amount thereof is generally in the range of 0.0005 to 0.2% by weight, preferably 0.001 to 0.05% by weight, in terms of weight of a metal contained in the catalyst, based on the weight of a mixture of the dicarboxylic acid component and the dihydroxy compound component. In the case of using the stabilizer, the amount thereof is generally in the range of 0.001 to 0.1% by weight, preferably 0.002 to 0.02% by weight, in terms of weight of phosphorus atom contained in the stabilizer, based on the weight of a mixture of the dicarboxylic acid component and the dihydroxy compound component. These catalyst and stabilizer may be added in the esterification reaction stage, or may be fed into the reactor in the first stage of the polycondensation reaction.

The polyester resin obtained in the above-mentioned liquid phase polycondensation procedure is generally molded into granular form (form of chips) by melt-extrusion molding.

The granular polyester resin obtained as above may be dried, if necessary.

Next, the packaging laminate material of the present invention is described in more concrete.

Figure 1:
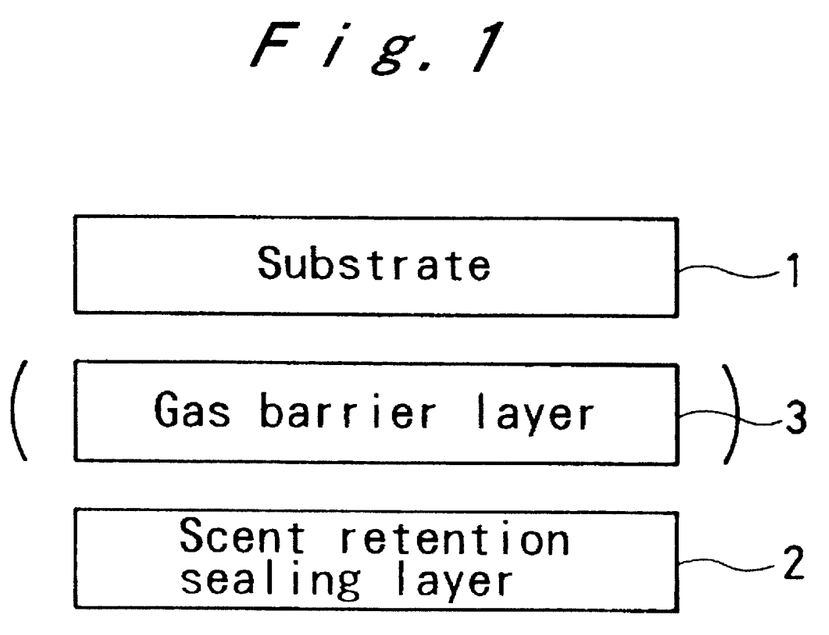
FIG. 1 is a conceptional view of a packaging laminate material according to the invention.

FIG. 1 is a conceptional view of a packaging laminate material according to the invention, and FIG. 2 shows examples of the structure of the packaging laminate material according to the invention.

As shown in FIG. 1, the packaging laminate material of the invention comprises a substrate 1 and a scent retention sealing layer 2, and a barrier layer 3 may be provided between the substrate 1 and the scent retention sealing layer 2 in case of necessity.

The substrate 1 comprises a paper layer and a layer of heat-fusible resin such as a polyolefin layer laminated on at least one surface of the substrate. The scent retention sealing layer 2 is made of a polyester resin according to the invention, and if necessary an adhesive layer may be provided on the side where a liquid is not brought into contact. The gas barrier layer 3 which is optionally provided according to necessity is made of a gas barrier film having an adhesive layer on one or both of the surfaces.

Papers employable for the paper layer are those conventionally used for packaging laminate materials. Examples of polyolefins used for the substrate 1 include polyethylene, polypropylene and polybutene and poly-4-methylpentene-1.

For the scent retention sealing layer 2, the aforementioned polyester resin is employed.

Examples of the gas barrier films used for the gas barrier layer 3 include aluminum foil and films of ethylene/vinyl alcohol copolymer (EVOH), polyamide resin, vinylidene chloride copolymer (PVDC), PET, O-PET and liquid crystalline polyester (LCP), and they may be used in combination.

Examples of the adhesives used for the adhesive layer include isocyanate adhesives, adherent polyester resins and EMAA (carboxylic acid modified polyolefin resins).

The packaging laminate material of the invention can take, for example, such structures as shown in FIG. 2 by combining the above mentioned each layers.

Figure 2A:
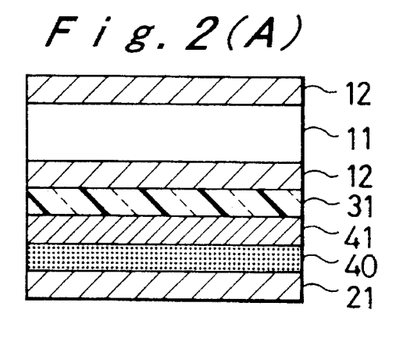
FIG. 2 is a schematic sectional view showing a structure of a packaging laminate material according to the invention.

In detail, the packaging laminate material shown in FIG. 2(A) consists of a substrate composed of a paper layer 11 and a polyolefin layer 12 provided on both surfaces of the paper layer, a gas barrier layer composed of a gas barrier film (aluminum foil) layer 31 and an adhesive (EMAA resin) layer 41, an adhesive (ADMER, available from Mitsui Petrochemical Industries, Ltd.) layer 40 and a scent retention sealing layer composed of a polyester resin layer 21, laminated in this order.

Figure 2B:
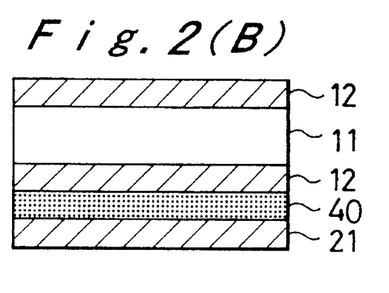

The packaging laminate material shown in FIG. 2(B) consists of a substrate composed of a paper layer 11 and a polyolefin layer 12 provided on both surfaces of the paper layer, an adhesive (ADMER) layer 40, and a scent retention sealing layer composed of a polyester resin layer 21, laminated in this order.

Figure 2C:
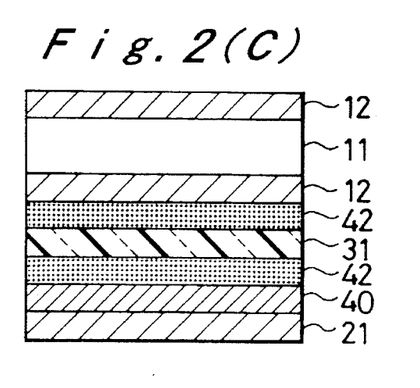

The packaging laminate material shown in FIG. 2(C) consists of a substrate composed of a paper layer 11 and a polyolefin layer 12 provided on both surfaces of the paper layer, a gas barrier layer 3 composed of a gas barrier film (O-PET) layer 31 and an adhesive (isocyanate adhesive) layer 42 provided on both surfaces of the gas barrier film layer, an adhesive (ADMER) layer 40, and a scent retention sealing layer composed of a polyester resin layer 21, laminated in this order.

Figure 2D:
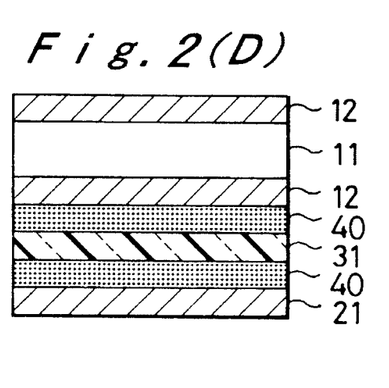

The packaging laminate material shown in FIG. 2(D) consists of a substrate composed of a paper layer 11 and a polyolefin layer 12 provided on both surfaces of the paper layer, a gas barrier layer 3 composed of a gas barrier film (EVOH, PVDC, O-PET, polyamide resin, etc.) layer 31 and an adhesive layer 40 provided on both surfaces of the gas barrier film layer, and a scent retention sealing layer composed of a polyester resin layer 21, laminated in this order.

Figure 2E:
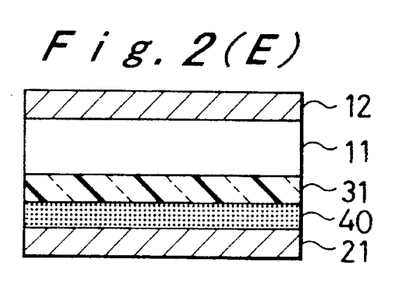

The packaging laminate material shown in FIG. 2(E) consists of a substrate composed of a polyolefin layer 12 and a paper layer 11, a gas barrier layer 3 composed of a gas barrier film (EVOH, polyamide resin, etc.) layer 31 and an adhesive (ADMER) layer 40, and a scent retention sealing layer composed of a polyester resin layer, laminated in this order.

Figure 2F:
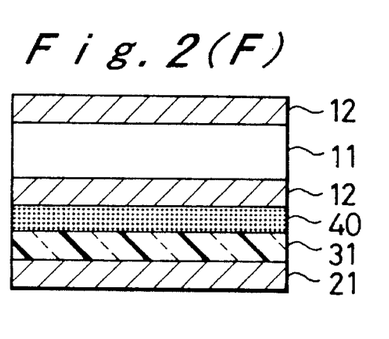

The packaging laminate material shown in FIG. 2(F) consists of a substrate composed of a paper layer 11 and a polyolefin layer 12 provided on both surfaces of the paper layer, a gas barrier layer 3 composed of an adhesive (ADMER) layer 40 and a gas barrier film (HOMO-PET) layer 31, and a scent retention sealing layer composed of a polyester resin layer 21, laminated in this order.

The packaging laminate material of the invention can take other various structures than those shown in FIG. 2.

In the packaging laminate material of the invention, the thicknesses of the substrate and the barrier layer can be optionally determined according to the use application of the products manufactured by the packaging laminate material.

The thickness of the polyester resin layer of the scent retention sealing layer 2 is in the range of 5 to 200 μm, preferably 10 to 50 μm. If the thickness thereof is too large, troubles occur in the container molding process because of its rigidity. If the thickness thereof is too small, the resulting laminate material lacks for heat-sealing strength.

The packaging laminate material of the invention can be prepared by a conventional process such as co-extrusion.

EFFECT OF THE INVENTION

The packaging laminate material of the invention is a laminate material comprising a paper substrate and a polyester resin layer provided on at least the inmost surface side, and the polyester resin contains specific components in the specific amounts. Accordingly, the packaging laminate material of the invention is excellent in the heat-sealing strength and is hardly reduced in the heat-sealing efficiency even when subjected to a hot hydrogen peroxide treatment. Further, since the polyester resin film itself is not broken (breakage rate: 0%), the packaging laminate material is excellent in the molding processability to produce paper containers. Moreover, the packaging laminate material of the invention has high scent retention properties, so that when the laminate material is used as packaging materials for liquids such as milk, juices, coffee drinks and soups, it gives no foreign taste or foreign odor to the content and does not permit the scent of the content such as juice to escape outside.

EXAMPLE

The present invention is further described by the following examples, but the invention is in no way limited to the examples.

Polyester resins are individually abbreviated as follows.

PT-36: polyester resin according to the invention, [terephthalic acid/adipic acid/ethylene glycol/cyclohexanedimethanol=90/10/70/30 (mole %)]

PET-G: PET-G6763, available from Eastman Kodak, [terephthalic acid/ethylene glycol/cyclohexanedimethanol= 100/70/30 (mole %)]

PET-J125: J-124, available from Mitsui Petrochemical Industries, Ltd., [terephthalic acid/ethylene glycol=100/100 (mole %)]

Preparation Example 1

Preparation of Polyester Resin (PT-36)

In a stainless steel reactor were charged 69.1 kg of terephthalic acid, 6.75 kg of adipic acid, 31.0 kg of ethylene glycol and 21.2 kg of cyclohexanedimethanol. The resulting mixture was heated to a temperature of 180° to 240 ° C. over a period of not shorter than 2.5 hours in a nitrogen gas atmosphere, to remove water from the reaction mixture. Then, the reaction mixture was transferred into a stainless steel polymerization bath, and to the bath were added a solution obtained by dissolving 16.0 g of germanium dioxide in 61.3 g of a 20% ethylammonium hydroxide aqueous solution and 23.1 g of monomethyl phosphite. The reaction temperature was raised from 220° C. to 250° C. over a period of not shorter than 2 hours. The pressure was gradually reduced to 0.5 Torr over a period of not shorter than 1 hour, while the temperature was raised to 265° C.

During the subsequent 1 hour, the temperature was raised to 275° C. The reaction system was kept for 3 hours under these conditions, then the pressure in the reactor was returned to an atmospheric pressure, and the polymer was extruded from the reactor. The polymer was then cooled and pelletized.

Example 1

Using the polyester resin obtained in Preparation Example 1, a film (thickness: 100 μm) was prepared by means of a film molding machine of 65 mmφ. The obtained film was measured on an intrinsic viscosity, a glass transition point, a melting point, a heat-sealing strength, a falling strength (breakage rate), taste and a coefficient of friction. The results are set forth in Table 2.

The above-mentioned physical properties were measured in the following manners.

Intrinsic Viscosity 1.2 g of the polyester resin was dissolved in o-chlorophenol in a concentration of 1 g/100 ml, and a solution viscosity of the solution was measured at 25° C. using a Ubbelode type capillary viscometer. Then, o-chlorophenol was gradually added to the solution to measure a solution viscosity on the lower concentration side, and a viscosity in a concentration of 0% is extrapolated to determine the intrinsic viscosity ( [η]).

Glass Transition Point

Figure 5:
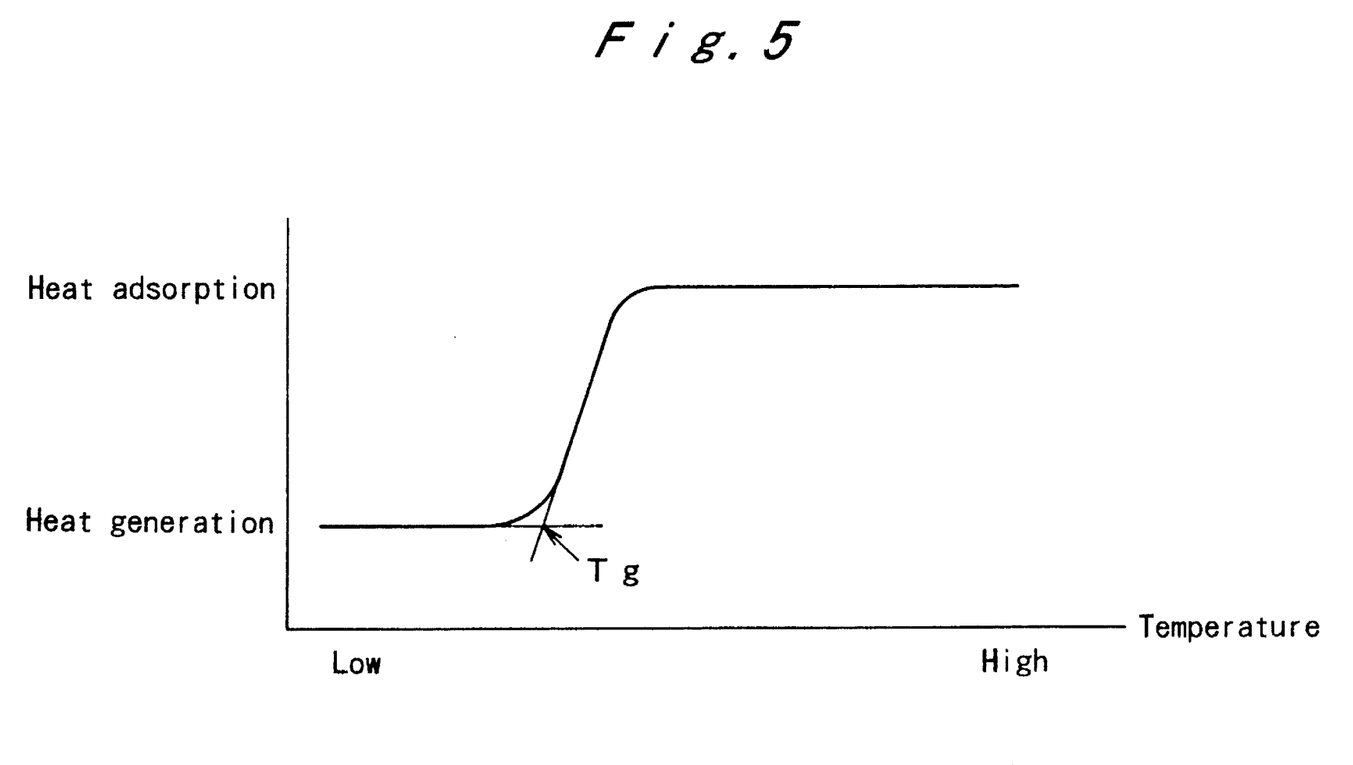
FIG. 5 is a view showing a method of measuring a glass transition point.

The polyester resin was dried at 40° C. under a pressure of about 5 mmHg over a period of 14 days. A thin specimen of about 10 mg withdrawn from a central portion of the dried pellets was placed in an aluminum pan for liquids in a nitrogen atmosphere. Then, the temperature in the aluminum pan is raised from room temperature (20° C.) at a rate of temperature elevation of 10° C./min, to measure the glass transition point of the polyester resin using a differential scanning calorimeter (DSC-7 type, produced by Perkin Elmer). The measuring method is shown in FIG. 5.

Melting Point

The temperature in the aluminum pan is raised from room temperature (20° C.) at a rate of temperature elevation of 10° C./min in the same manner as for the glass temperature point, to measure the peak temperature in heat of fusion (melting point) of the polyester resin using a differential scanning calorimeter (DSC-7 type, produced by Perkin Elmer).

Heat-sealing Strength

The polyester resin was melt-extruded at a cylinder temperature of 280° C. using an extruder of 65 mmφ (produced by Hitachi Zosen K.K.), and the molten film was cooled over a cooling drum (surface temperature: 30° C.) equipped with a static close contact device, to obtain a film having a thickness of 100 μm.

The film was allowed to stand in an oven of 23° C. and 50%RH for 1 day (this procedure (a) is referred to "initial procedure", hereinafter) Then, the film was immersed in a 35% hydrogen peroxide aqueous solution of 80 ° C. for 30 seconds, followed by wiping off the hydrogen peroxide aqueous solution, and dried at 70° C. for 30 minutes (this procedure (b) is referred to "hot hydrogen peroxide aqueous solution treatment" hereinafter).

The specimen prepared as above was measured on the heat-sealing strength in accordance with a test method indicated by JIS Z-1707.

Figure 6:
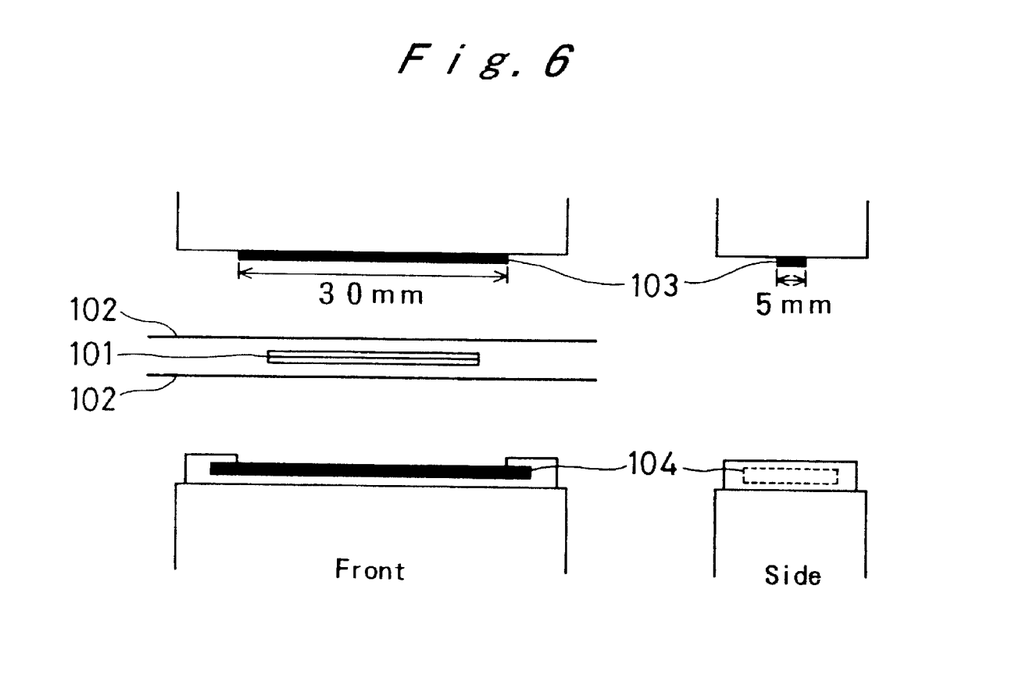
FIG. 6 is a schematic illustration of a heat sealer.

FIG. 6 is a schematic illustration of a heat sealer. Concrete heat-sealing conditions are as follows.

Heat sealer: produced by Tester Sangyo K.K.
Film: about 120 mm×120 mm
Upper sealing bar: made of aluminum and having width of 5 mm. The temperature of this upper sealing bar is varied from 80° C. to 140° C. to measure heat-sealing properties in practical use.
Lower sealing bar: serving to receive the upper sealing bar and having a thickness of 5.2 mm, Shore A hardness of 52±1 and a temperature of 70° C.
Sealing pressure:2 kgf/cm$^2$
Sealing time:2 seconds
Instron type universal tester:A heat-sealed film sample was cut to form a specimen having a width of 15 mm, and the heat-sealed portion of the specimen was tensed at a tensile rate of 300 mm/min at 180°, to measure the maximum load on the heat-sealed portion. Thus measured maximum load was determined as a heat sealing strength.

Falling Strength (Breakage Rate)

Two of films (thickness:100 μm, longitudinal length: 200 mm, lateral length:200 mm) were heat-sealed on their three sides using the above-mentioned heat sealer (produced by Tester Sangyo K.K.) under the following conditions, to prepare a bag. The bag was filled with 250 ml of a distilled water, and the open side of the bag was sealed in such a manner that no air was remained inside of the bag.

20 of the bags prepared as above were allowed to stand in a refrigerator of 5° C. for 1 day, and then dropped on a concrete surface from a height of 1.2 m, to determine a breakage rate.

The breakage rate was calculated by the following formula.

$$\text{Breakage rate (\%)} = \frac{\text{Number of broken bags}}{\text{Number of all bags tested}} \times 100$$

Taste

Using a film (thickness:100 μm) obtained after the initial procedure, a bag whose three sides was sealed in the same manner as that in the measurement of falling strength was prepared. The bag was filled with 250 ml of a pure water, and the open side of the bag was sealed in such a manner that no air was remained inside of the bag.

The bag was stored in an oven at 40° C. for 1 month, and was subjected to organoleptic test for taste evaluation by 10 panelists.

○: Any change of taste is not recognized.
×: Change of taste is recognized.

Coefficient of Friction

The film (thickness:100 82 m) obtained after the initial procedure was measured on the coefficient of friction at a tensile rate of 200 mm/min in accordance with ASTM-D-1894 using an Instron type universal tester.

1.0 or more: Slipperiness of the film is extremely bad, and practical handling thereof is impossible 0.4–0.6: Slipperiness of the film is adequate, and practical handling thereof is easily made.

0.3 or less: Slipperiness of the film is too high, and practical handling thereof is hardly made.

Comparative Example 1

A polyethylene resin (Milason M-11, available from Mitsui Petrochemical Industries, Ltd.) was measured on an intrinsic viscosity, a glass transition temperature, a melting point, a heat-sealing strength, a falling strength (breakage rate), taste and a coefficient of friction in the same manners as described in Example 1. The results are set forth in Table 2.

Examples 2–9 & Comparative Examples 2–10

The procedure of Preparation Example 1 was repeated except for reacting the compounds having the compositions set forth in Table 1 to prepare polyester resins. The polyester resins were measured on the various physical properties in the same manners as described in Example 1.

The results are set forth in Table 2.

TABLE 1

| Composition | Ex. 1 (PT-36) | Com. Ex. 1 (LDPE) | Com. Ex. 2 (PET) | Com. Ex. 3 (PET-G) | Ex. 2 | Ex. 3 | Com. Ex. 4 | Com. Ex. 5 | Com. Ex. 6 | Com. Ex. 7 |
|---|---|---|---|---|---|---|---|---|---|---|
| Terephthalic acid (mole %) | 90 | | 100 | 100 | 95 | 80 | 75 | 90 | 80 | 75 |
| Adipic acid (mole %) | 10 | | | | 5 | 20 | 25 | 10 | 20 | 25 |
| Succinic acid (mole %) | | | | | | | | | | |
| Sebacic acid | | | | | | | | | | |

TABLE 1-continued

| | | | | | | | | | |
|---|---|---|---|---|---|---|---|---|---|
| Ethylene glycol (mole %) | 70 | 100 | 70 | 70 | 70 | 70 | 100 | 100 | 100 |
| Neopentyl glycol (mole %) | | | | | | | | | |
| Cyclohexane-dimethanol (mole %) | 30 | | 30 | 30 | 30 | 30 | | | |
| Nupol*) (mole %) | | | | | | | | | |
| Trimethylolpropane (mole %) | | | | | | | | | |

| Composition | Ex. 4 | Ex. 5 | Ex. 6 | Com. Ex. 8 | Com. Ex. 9 | Com. Ex. 10 | Ex. 7 | Ex. 8 | Ex. 9 |
|---|---|---|---|---|---|---|---|---|---|
| Terephthalic acid (mole %) | 90 | 90 | 90 | 90 | 100 | 100 | 90 | 90 | 90 |
| Adipic acid (mole %) | 10 | 10 | 10 | 10 | | | 10 | 10 | 10 |
| Succinic acid (mole %) | | | | | | | | | |
| Sebacic acid (mole %) | | | | | | | | | |
| Ethylene glycol (mole %) | 90 | 80 | 60 | 50 | 90 | 50 | 68 | 80 | 70 |
| Neopentyl glycol (mole %) | | | | | | | | 20 | |
| Cyclohexane-dimethanol (mole %) | 10 | 20 | 40 | 50 | 10 | 50 | 32 | | |
| Nupol (mole %) | | | | | | | | | 30 |
| Trimethylolpropane (mole %) | | | | | | | 0.3 | | |

*) Nupol BPE20 (trade name, available from Sanyo Kasei K.K.) Mixture represented by the following formula:

wherein n and m are numbers satisfying the condition of $2 \leq n + m \leq 4$.

TABLE 2

| | | Ex. 1 | | Com. Ex. 1 | | Com. Ex. 2 | | Com. Ex. 3 | | Ex. 2 | |
|---|---|---|---|---|---|---|---|---|---|---|---|
| Intrinsic viscosity (dl/g) | | 0.75 | | | | 0.79 | | 0.86 | | 0.80 | |
| Glass transition temperature (°C.) | | 59 | | −125 | | 78 | | 80 | | 72 | |
| Melting point (°C.) | | | | 112 | | | | | | | |
| Heat-sealing strength g/15 mm | Heat-sealing temper. (°C.) | *a) | *b) | *a) | *b) | *a) | *b) | *a) | *b) | *a) | *b) |
| | 80 | 60 | 0 | | | | | | | | |
| | 90 | 1400 | 0 | | | 0 | 0 | | | 120 | 0 |
| | 100 | 1500 | 80 | 100 | 0 | 700 | 0 | 200 | 0 | 1200 | 0 |
| | 110 | 3500 | 200 | 90 | 100 | 4100 | 0 | 1200 | 0 | 2900 | 250 |
| | 120 | 3400 | 1900 | 1600 | 1700 | 3800 | 0 | 1800 | 60 | 3500 | 1100 |
| | 130 | 3500 | 3300 | 1600 | 1700 | 4100 | 0 | 3500 | 110 | 3500 | 1800 |
| | 140 | 3500 | 3400 | 1600 | 1600 | 4000 | 0 | 3600 | 500 | 3600 | 3500 |
| Falling strength (Breakage rate) | | 0% | | 0% | | 0% | | 0% | | 0% | |
| Taste | | ○ | | X | | ○ | | ○ | | ○ | |
| Coefficient of friction | | 0.4 | | 0.4 | | 0.4 | | 0.4 | | 0.4 | |

TABLE 2-continued

|  |  | Ex. 3 | | Com. Ex. 4 | | Com. Ex. 5 | | Com. Ex. 6 | | Com. Ex. 7 | |
|---|---|---|---|---|---|---|---|---|---|---|---|
| Intrinsic viscosity (dl/g) | | 0.76 | | 0.75 | | 0.74 | | 0.81 | | 0.89 | |
| Glass transition temperature (°C.) | | 45 | | 31 | | 56 | | 42 | | 29 | |
| Melting point (°C.) | | | | | | 231 | | 215 | | 195 | |
| Heat-sealing strength g/15 mm | Heat-sealing temper. (°C.) | *a) | *b) | *a) | *b) | *a) | *b) | *a) | *b) | *a) | *b) |
| | 80 | 1600 | 0 | 2900 | 100 | 1800 | 0 | 1200 | 0 | 770 | 0 |
| | 90 | 3000 | 750 | 3000 | 1500 | 2000 | 0 | 1530 | 0 | 1286 | 0 |
| | 100 | 3100 | 1500 | 3000 | 2400 | 2200 | 0 | 1700 | 0 | 1444 | 0 |
| | 110 | 3300 | 2700 | 3100 | 2800 | 3100 | 0 | 2500 | 0 | 1743 | 0 |
| | 120 | 3500 | 2800 | 3200 | 2700 | 2700 | 0 | 2300 | 0 | 2152 | 0 |
| | 130 | 3400 | 2800 | 3000 | 2700 | 2900 | 0 | 2700 | 0 | 2100 | 0 |
| | 140 | 3400 | 2600 | 2900 | 2700 | 3100 | 0 | 2600 | 0 | 2203 | 0 |
| Falling strength (Breakage rate) | | 10% | | 50% | | 70% | | 80% | | 90% | |
| Taste | | O | | X | | O | | O | | X | |
| Coefficient of friction | | 0.5 | | 1 or more | | 0.4 | | 1 or more | | 1 or more | |

|  |  | Ex. 4 | | Ex. 5 | | Ex. 6 | | Com. Ex. 8 | | Com. Ex. 9 | |
|---|---|---|---|---|---|---|---|---|---|---|---|
| Intrinsic viscosity (dl/g) | | 0.80 | | 0.75 | | 0.81 | | 0.76 | | 0.75 | |
| Glass transition temperature (°C.) | | 56 | | 58 | | 62 | | 64 | | 75 | |
| Melting point (°C.) | | | | | | | | | | | |
| Heat-sealing strength g/15 mm | Heat-sealing temper. (°C.) | *a) | *b) | *a) | *b) | *a) | *b) | *a) | *b) | *a) | *b) |
| | 80 | 200 | 0 | 50 | 0 | 0 | 0 | 0 | 0 | | |
| | 90 | 810 | 500 | 930 | 400 | 20 | 0 | 0 | 0 | 20 | 0 |
| | 100 | 2200 | 930 | 1900 | 810 | 820 | 300 | 0 | 0 | 300 | 0 |
| | 110 | 3020 | 1500 | 2500 | 1050 | 1800 | 800 | 630 | 210 | 720 | 0 |
| | 120 | 3600 | 1800 | 3400 | 1840 | 2400 | 1200 | 900 | 400 | 2060 | 0 |
| | 130 | 3900 | 2800 | 4000 | 2500 | 3500 | 1800 | 1900 | 930 | 3800 | 30 |
| | 140 | 4500 | 3500 | 4300 | 3400 | 3600 | 2500 | 2800 | 1700 | 5800 | 200 |
| Falling strength (Breakage rate) | | 0% | | 0% | | 0% | | 0% | | 0% | |
| Taste | | O | | O | | O | | X | | O | |
| Coefficient of friction | | 0.5 | | 0.4 | | 0.4 | | 0.4 | | 0.4 | |

|  |  | Com. Ex. 10 | | Ex. 7 | | Ex. 8 | | Ex. 9 | |
|---|---|---|---|---|---|---|---|---|---|
| Intrinsic viscosity (dl/g) | | 0.83 | | 0.80 | | 0.80 | | 0.74 | |
| Glass transition temperature (°C.) | | 84 | | 60 | | 54 | | 68 | |
| Melting point (°C.) | | | | | | | | | |
| Heat-sealing strength g/15 mm | Heat-sealing temper. (°C.) | *a) | *b) | *a) | *b) | *a) | *b) | *a) | *b) |
| | 80 | | | 100 | 0 | 70 | 0 | 110 | 0 |
| | 90 | | | 1300 | 30 | 1670 | 10 | 300 | 0 |
| | 100 | 0 | 0 | 1500 | 120 | 5470 | 90 | 530 | 50 |
| | 110 | 800 | 0 | 3600 | 350 | 5000 | 750 | 1000 | 530 |
| | 120 | 1300 | 20 | 3300 | 1800 | 4580 | 1200 | 1800 | 1050 |
| | 130 | 2500 | 180 | 3400 | 3400 | 4700 | 3800 | 2360 | 1500 |
| | 140 | 3800 | 400 | 3600 | 3500 | 4600 | 5050 | 4300 | 1700 |
| Falling strength (Breakage rate) | | 0% | | 0% | | 0% | | 0% | |
| Taste | | X | | O | | O | | O | |
| Coefficient of friction | | 0.4 | | 0.4 | | 0.5 | | 0.4 | |

*a) after initial procedure
*b) after hot hydrogen peroxide aqueous solution treatment

Example 10

A film of PT-36 (thickness:20 μm) prepared by a film molding machine was dry-laminated on a base paper of 340 g/m² with an isocyanate adhesive, to obtain a specimen of a laminate material for measurement of the heat-sealing properties.

The specimen was examined on the influence of the hot hydrogen peroxide treatment on the heat-sealing properties in the same manner as described in Example 10. The results are set forth in Table 3.

TABLE 3

| | | Ex. 10 | | Com. Ex. 11 | | Com. Ex. 12 | | Com. Ex. 13 | |
|---|---|---|---|---|---|---|---|---|---|
| IV (dl/g) | | 0.75 | | — | | 0.86 | | 0.79 | |
| Tg (°C.) | | 80 | | <–100 | | 80 | | 78 | |
| *1) | | not made | made | not made | made | not made | made | not made | made |
| *3) | *2) 80° C. | 0 | — | — | — | — | — | — | — |
| | 90 | 1100 | — | — | — | — | — | — | — |
| | 100 | 1200 | 0 | 0 | — | — | — | 600 | — |
| | 110 | 3100 | 150 | 50 | 30 | 900 | — | 3000 | 0 |
| | 120 | 3300 | 1600 | 2000 | 1800 | 1500 | 0 | 3500 | 0 |
| | 130 | 3300 | 2500 | 2500 | 2200 | 1800 | 50 | 4000 | 0 |
| | 140 | 3300 | 3000 | 2800 | 2800 | 1900 | 400 | 4200 | 0 |
| | 150 | (3300) | (3000) | (2800) | (2700) | (1800) | (1000) | (4100) | (0) |
| | 160 | (3200) | (2900) | (2800) | (2700) | (1900) | (1200) | (4100) | (0) |

Numerals within parentheses mean that paper scorched and turned brown. That is, the laminate material has bad appearance in practical use.
*1) Hot hydrogen peroxide treatment
*2) Heat-sealing temperature
*3) Heat-sealing strength g/15 mm The specimen was examined on the influence of the hot hydrogen peroxide treatment on the heat-sealing properties. The results are set forth in Table 3.

Measurement of Heat-sealing Strength

The specimen was immersed in a 35% hydrogen peroxide aqueous solution of 80° C. for 30 seconds and then dried with warm air of 70° C. Two levels of specimens, namely, thus treated specimen and the untreated specimen, were measured on the heat-sealing strength under the conditions of a heat-sealing pressure of 2 kg/cm², a heat-sealing time of 10 seconds and other conditions based on JIS Z 1707.

Comparative Example 11

The procedure of Example 10 was repeated except for using a polyethylene resin (Milason M-11, available from Mitsui Petrochemical Industries, Ltd.) instead of PT-36, to obtain a specimen of a laminate material.

The specimen was examined on the influence of the hot hydrogen peroxide treatment on the heat-sealing properties in the same manner as described in Example 10. The results are set forth in Table 3.

Comparative Example 12

The procedure of Example 10 was repeated except for using PET-G instead of PT-36, to obtain a specimen of a laminate material.

The specimen was examined on the influence of the hot hydrogen peroxide treatment on the heat-sealing properties in the same manner as described in Example 10. The results are set forth in Table 3.

Comparative Example 13

The procedure of Example 10 was repeated except for using PET-J125 instead of PT-36, to obtain a specimen of a laminate material.

Example 11

A substrate composed of a base paper of 340 g/m² and a polyethylene resin (Milason M-16, available from Mitsui Petrochemical Industries, Ltd.) of 20 μm laminated on the outside of the base paper was prepared. A laminate film composed of an adherent polyethylene resin (ADMER, available from Mitsui Petrochemical Industries, Ltd.) of 10 μm and PT-36 of 15 μm was also prepared. The substrate, the laminated film and the same polyethylene of 20 μm as used for the outside layer of the substrate were laminated in this order so that the adherent polyethylene resin of the laminated film was provided on the inside of the substrate, to obtain a laminate material.

Figure 3:
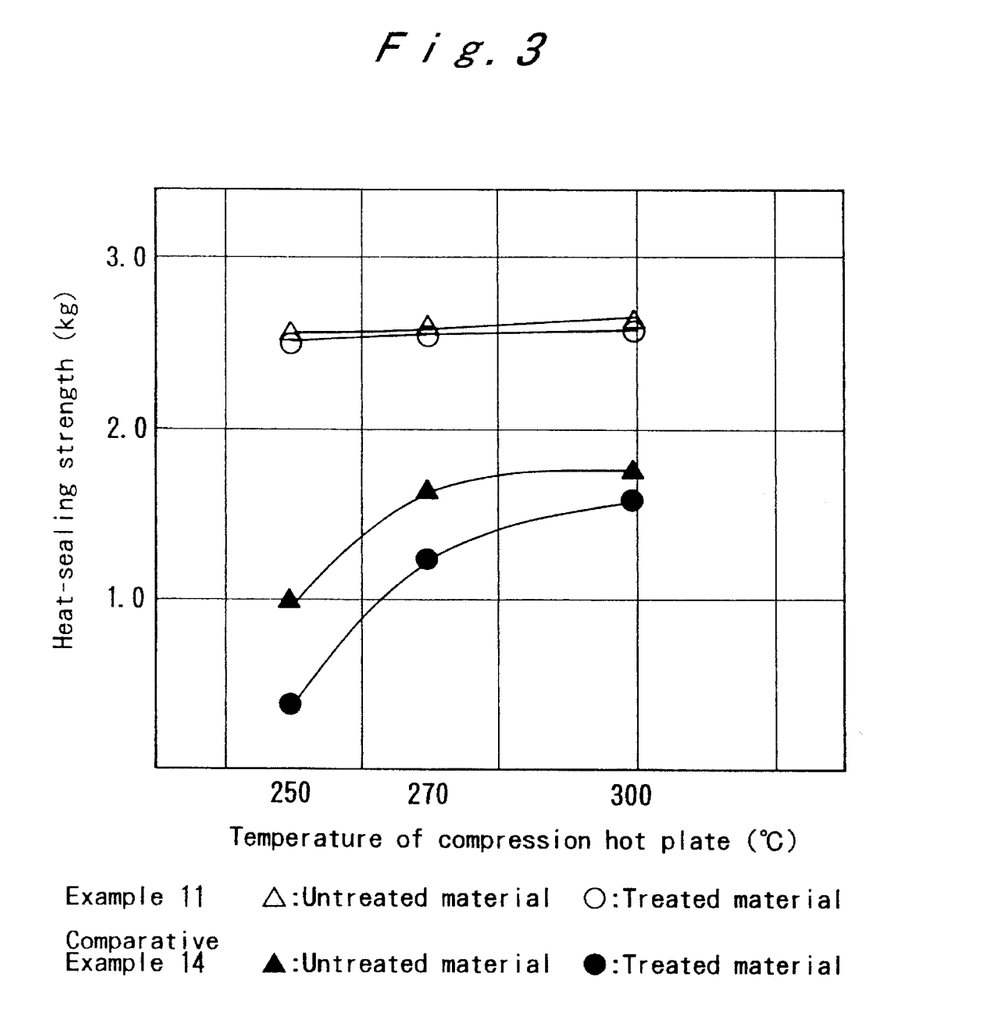
FIG. 3 is a view showing an influence of a hot hydrogen peroxide treatment on the heat-sealing strength for a laminate material comprising PT-36 and a laminate material comprising PETG.

The obtained specimen was examined on the influence of the hot hydrogen peroxide treatment on the heat-sealing properties. The results are shown in FIG. 3.

Measurement of Heat-sealing Strength

The specimen was immersed in a hydrogen peroxide solution of 80° C. for 6 seconds, followed by wiping off the solution, and the specimen was dried with warm air of 70° C. for 30 minutes. Two levels of specimens, namely, thus treated specimen and the untreated specimen, were measured on the heat-sealing strength in the same manner as described in Example 1. The measurement was carried out under the condition that the both PT-36 layers present inside of the laminate material were saturated in the strength.

Comparative Example 14

The procedure of Example 11 was repeated except for using PET-G instead of PT-36 to obtain a laminate material.

The obtained specimen was examined on the influence of the hot hydrogen peroxide treatment on the heat-sealing properties in the same manner as described in Example 11. The results are shown in FIG. 3.

Example 12

Using the specimen prepared in Example 10, a limonene residue percentage and taste of pure water were measured in the following manners. The results are set forth in Table 4.

Measurement of D-limonene Residue Percentage

A commercially available 100% orange juice (product in Ehime prefecture) contained in a 1 liter glass bottle was heated to 85° C. The orange juice was introduced into a three-side sealed testing packaging material, then the open side of the packaging material was heat-sealed, and the orange juice was stored in the packaging material at 5 ° C. After 3 weeks, a D-limonene residue in the orange juice was measured by means of gas chromatography.

Measurement of Pure Water Taste

A pure water was heated to 85° C. and introduced into the above-mentioned three-side sealed testing packaging material, and the open side of the .packaging material was heat-sealed. The pure water was stored in the packaging material at 37° C. for 7 days, and then subjected to an organoleptic test for taste evaluation by 8 panelists.

○: Any change of taste is not recognized.

×: Change of taste is recognized.

Comparative Example 15

Using the specimen prepared in Comparative Example 12, a limonene residue percentage and taste of pure water were measured in the same manner as described in Example 12. The results are set forth in Table 4.

Comparative Example 16

20 μm of a polyethylene resin (M-201P, available from Mitsui Petrochemical Industries, Ltd.), 9 μm of an aluminum foil, 15 μm of EMAA (Nucrel N0908C, available from Mitsui Petrochemical Industries, Ltd.) and 25 μm of a polyethylene resin (M-201P, available from Mitsui Petrochemical Industries, Ltd.) were laminated in this order on the inner side of a base paper having a basis weight of 200 g/m², to prepare a specimen.

Using the specimen prepared as above, a limonene residue percentage and taste of pure water were measured in the same manner as described in Example 12. The results are set forth in Table 4.

TABLE 4

| | Rate of D-limonene residue | Evaluation of pure water taste |
| --- | --- | --- |
| Example 12 | 65% | ○ |
| Com. Ex. 15 | 64% | ○ |
| Com. Ex. 16 | 1% | X |

Example 15

On a substrate comprising 5 μm of a polyethylene resin (M-18P, available from Mitsui Petrochemical Industries, Ltd.) laminated on the outer side of a base paper (200 g/m²) and 20 μm of a polyethylene resin (M-18P, available from Mitsui Petrochemical Industries, Ltd.) and 7 μm of an aluminum foil laminated in this order on the inner side of the base paper, a film composed of 15 μm of PT-36 and 10 μm of an adherent polyethylene resin (ADMER, available from Mitsui Petrochemical Industries, Ltd.) was laminated using 15 μm of EMAA (Nucrel N0908C, available from Mitsui Petrochemical Industries, Ltd.) in such a manner that the polyethylene resin of the film faced the inner surface of the substrate, to prepare a laminate material.

Figure 4:
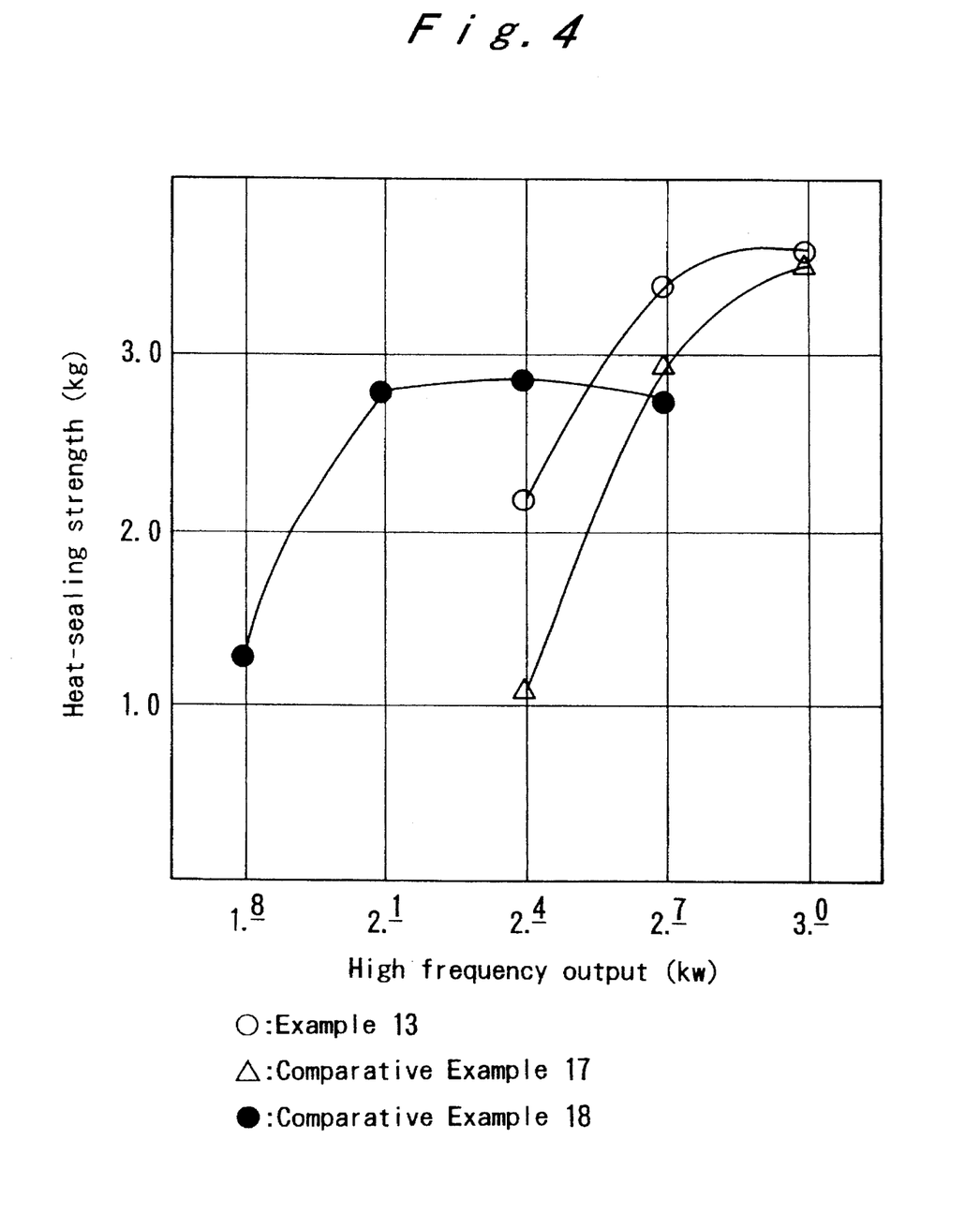
FIG. 4 is a view showing an influence of heating on the heat-sealing strength for a laminate material comprising PT-36 and a laminate material comprising other resin.

The above-obtained laminate material was heat-sealed on the inner sides of both ends to prepare a tube. The tube was immersed in a 35% hydrogen peroxide solution of 80° C. for 30 minutes and dried with warm air of 70° C. Then, the tube was filled with water, and the aluminum foil of the tube was heated by a high-frequency dielectric heating method to be sealed in the lateral direction of the tube. In this process, the output of the high frequency was varied, and the tensile strength at the laterally sealed portion of the container was measured using the same tensile tester as used in Example 10. The results are shown in FIG. 4.

Comparative Example 17

The procedure of Example 15 was repeated except for using PET-G instead of PT-36, to prepare a laminate material.

Using the laminate material prepared as above, a container was manufactured in the same manner as described in Example 15. The tensile strength at the laterally sealed portion of the container was measured. The results are shown in FIG. 4.

Comparative Example 18

The procedure of Example 13 was repeated except for using LDPE instead of PT-36, to prepare a laminate material.

Using the laminate material prepared as above, a container was manufactured in the same manner as described in Example 13. The tensile strength at the laterally sealed portion of the container was measured. The results are shown in FIG. 4.

We claim:

1. A packaging laminate material comprising a paper substrate and a polyester resin layer provided on at least one side thereof, wherein the polyester resin comprises:

(A) dicarboxylic acid units comprising
   constituent units from a terephtalic acid in an amount of 80 to 95 mole % and
   constituent units from an adipic acid in an amount of 20 to 5 mole %; and (B) dihydroxy compound units comprising
   constituent units from ethylene glycol in an amount of 55 to 90 mole % and
   constituent units from at least one of the compounds selected from the group consisting of neopentyl glycol, cyclohexane dimethanol, and a compound represented by the following formula (1) in an amount of 45 to 10 mole %, based on 100 mole % of the dihydroxy compound units wherein n and m satisfy the condition Z≦n+m≦4, and wherein said polyester resin layer has a heat-sealing strength to itself as measured at a heat-sealing temperature of 130° C. in accordance with JIS Z 1707 of not less than 2.0 kgf/15 mm; and a heat-sealing strength to itself as measured at a heat-sealing temperature of 130° C. in accordance with JIS Z 1707 of not less than 1.0 kgf/15 mm when measured after immersing the polyester resin layer in a 35% hydrogen peroxide solution of 80° C. for 30 seconds, wiping off the hydrogen peroxide solution and then drying by air flow at 70° C. for 30 minutes.

2. The packaging laminate material as claimed in claim 1, wherein the polyester resin further comprises, in addition to the dicarboxylic acid units and the dihydroxy compound units:

(C) polyfunctional compound units selected from the group consisting of
constituent units from a polycarboxylic acid compound with a valence of 3 or more,
constituent units from a polyhydroxy compound with a valence of 3 or more and
mixtures thereof in an amount of 0.01 to 2 mole % based on 100 mole % of the total amounts of the dicarboxylic acid units and the dihydroxy compound units.

3. A packaging laminate material comprising a paper substrate and a polyester resin layer provided on at least one side thereof, wherein the polyester resin comprises:

(A) dicarboxylic acid units comprising
constituent units from a terephthalic acid in an amount of 80 to 95 mole % and
constituent units from an adipic acid in an amount of 20 to 5 mole %, based on 100 mole % of the dicarboxylic acid units; and (B) dihydroxy compound units comprising
constituent units from ethylene glycol in an amount of 55 to 90 mole % and
constituent units from cyclohexanedimethanol in an amount of 45 to 10 mole %, based on 100 mole % of the dihydroxy compound units.

4. A packaging laminate material comprising a paper substrate and a polyester resin layer provided on at least one side thereof, wherein the polyester resin comprises:

(A) dicarboxylate acid units comprising
constituent units from a terephthalic acid in an amount of 80 to 95 mole % and
constituent units from an adipic acid in an amount of 20 to 5 mole %, based on 100 mole % of the dicarboxylic acid units; and (B) dihydroxy compound units comprising
constituent units from ethylene glycol in an amount of 55 to 90 mole % and
constituent units from cyclohexanedimethanol in an amount of 45 to 10 mole % based on 100 mole % of the dihydroxy compound units; and wherein
the heat-sealing strength of the polyester resin layer to itself as measured at a heat-sealing temperature of 130° C. in accordance with JIS Z 1707 is not less than 2.0 kgf/15 mm; and
the heat sealing strength of the polyester resin layer to itself as measured at a heat-sealing temperature of 130° C. in accordance with JIS Z 1707 is not less than 1.0 kgf/15 mm when measured after immersing the polyester resin layer in a 35% hydrogen peroxide solution of 80° C. for 30 seconds, wiping off the hydrogen peroxide solution and then drying by air flow at 70° C. for 30 minutes.

5. The packaging laminate material as claimed in any of claims 3 or 4, wherein the polyester resin further comprises, in addition to the dicarboxylic acid units and the dihydroxy compound units:

(C) polyfunctional compound units selected from the group consisting of
constituent units from a polycarboxylic acid compound with a valence of 3 or more,
constituent units from a polyhydroxy compound with a valence of 3 or more and
mixtures thereof in an amount of 0.01 to 2 mole % based on 100 mole % of the total amounts of the dicarboxylic acid units and dihydroxy compound units.

* * * * *